Patented May 10, 1938

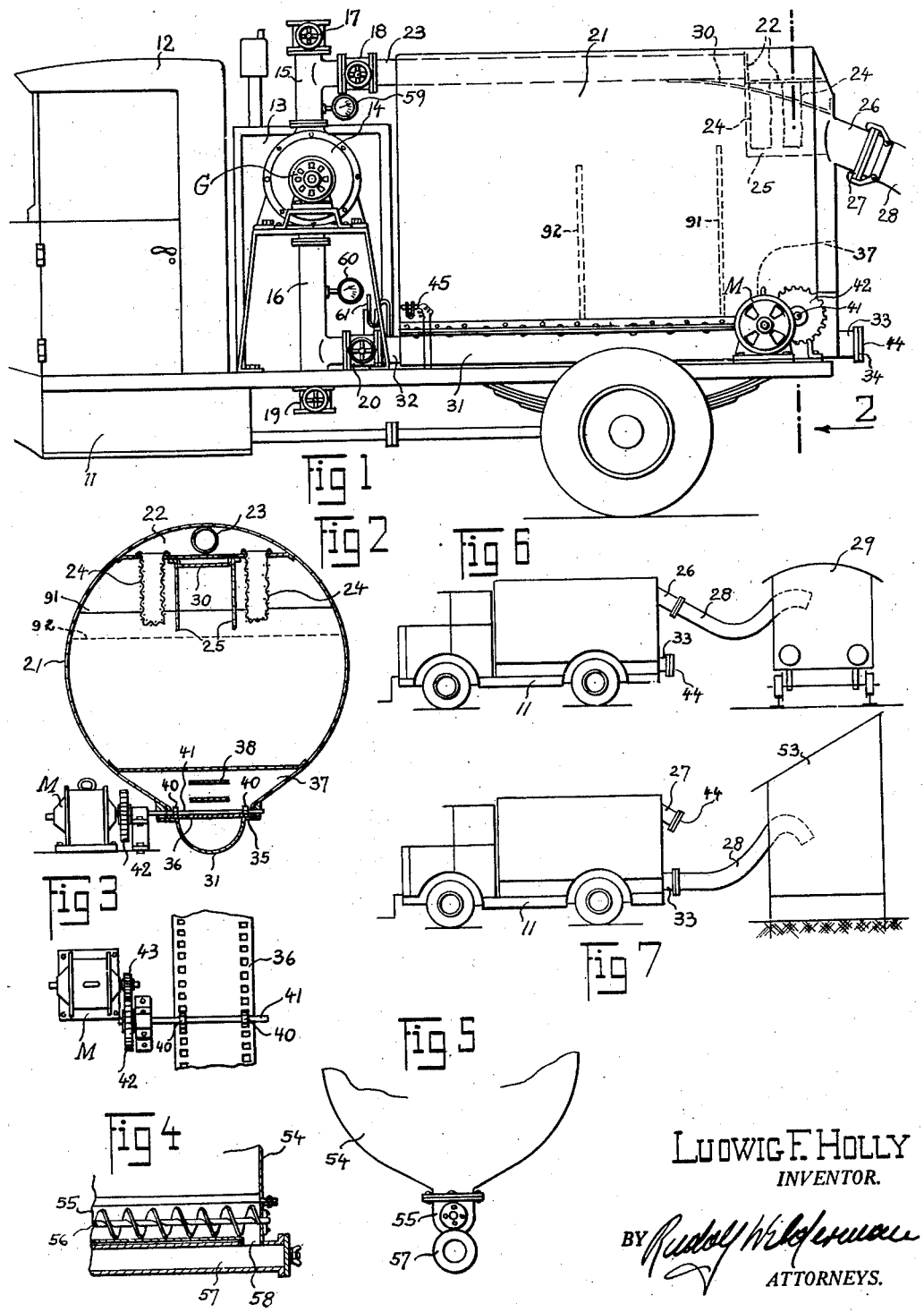

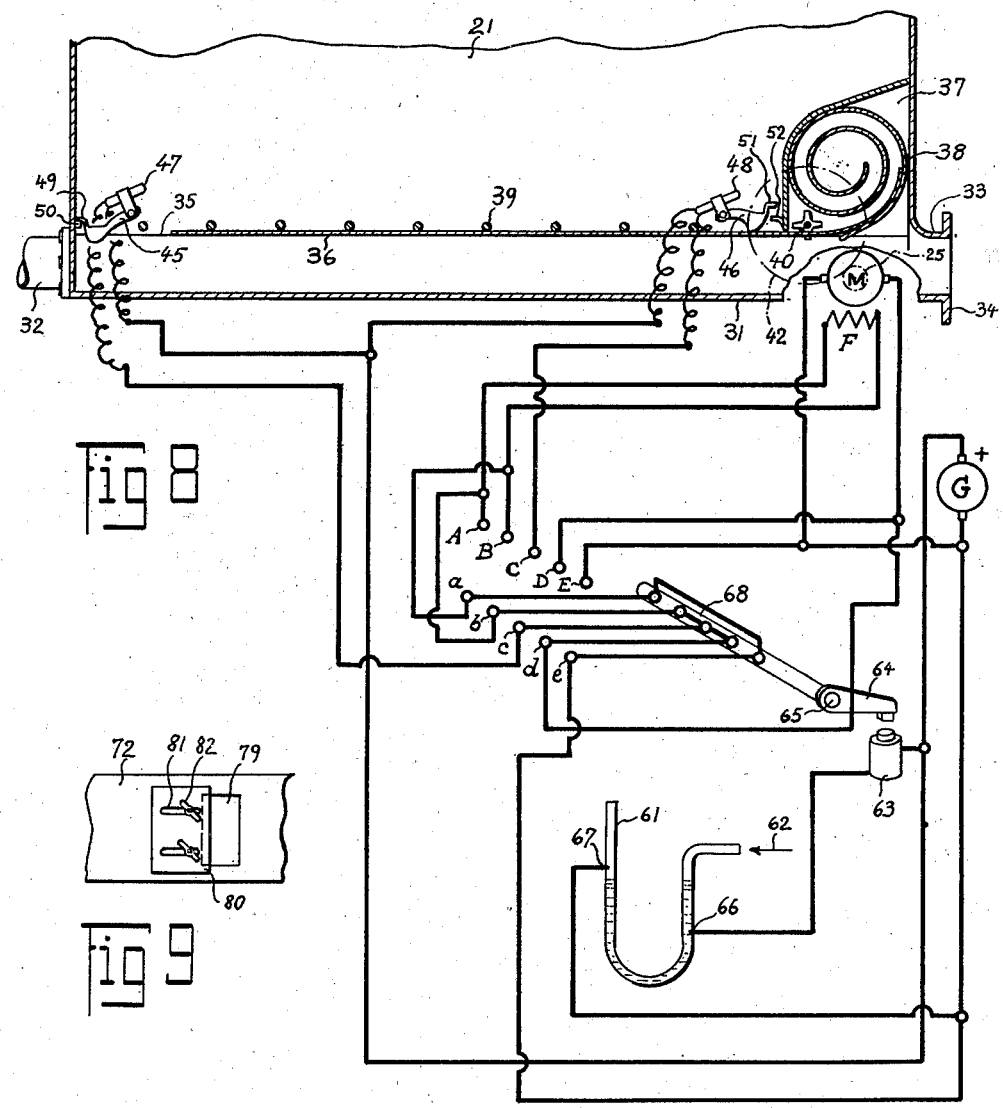

2,116,603

UNITED STATES PATENT OFFICE 2,116,603

METHOD OF AND MEANS FOR TRANSFERRING LOOSE BULK MATERIAL

Ludwig F. Holly, Madison, N. J.

Application August 26, 1933, Serial No. 686,885

16 Claims. (Cl. 214—83)

This invention relates to a method of and means for the transfer of loose bulk material. More particularly this invention relates to the transfer of such material between unfixed, varying points; at the same time it concerns transfer between points where for that reason or on account of distance a permanent, fixed conveying system is not feasible.

On the other hand I intend to bring about by this novel transfer method and means the flexibility indicated above together with the utmost expediency, economy of operation and maintenance at a very modest original cost of equipment.

This may be best explained by referring to examples and by comparison to the prior art. It has been customary to transfer loose bulk material, from freight cars for instance to an industrial plant, or other point of destination at a certain distance from the railroad siding, by transferring the bulk material, say flour, cement or malt, in barrels or bags which are stacked in the freight car, into a truck and to unload this material in the same manner, at the other end, where it then may be removed from the bags or barrels and be placed into a collective storage container.

This necessitates of course that the material be placed into bags or barrels at the original point of shipment where it is placed into the freight car.

Such underdivided handling is overcome by my invention, which does not make it necessary to handle the material in parcels but it may be loosely poured and filled into a freight car. At the intermediate railroad siding, from which it is to be transferred to the ultimate point of destination, the material is transferred from the freight car in a continuous flow into a suitable container on a vehicle which accommodates the contents of said car in one or several loads, and brings it to the ultimate point of destination. The container is there again unloaded, in a continuous flow, the loose bulk being handled pneumatically throughout, as later on described.

Another object of this invention is to grade the loose bulk material during transfer and to provide means for delivering it separately, for instance the finer material after the coarser material.

While the foregoing specific example will also be illustrated in the following description (Figs. 6 and 7), the application of the method of this invention is of course not to be limited thereto, it may just as well be applied in the instance mentioned above for transfer from the point of origin to the railroad, or for the transfer from that point of origin to the point of ultimate destination.

Likewise the means of my invention, as illustrated in the following by specific examples, are not to be limited to the showing of the drawings but the protection of this patent is to extend to adaptations thereof within the ordinary skill of engineers and manufacturers.

In the drawings:

Fig. 1 shows a side view of a truck on which a means of my invention is accommodated.

Fig. 2 shows a sectional end view of said means taken at the rear of a truck.

Fig. 3 shows a detailed top view illustrating the operation of a sliding false bottom forming part of my invention.

Figs. 4 and 5 illustrate in a sectional side view and in a rear view, respectively, a modification of my invention.

Figs. 6 and 7 serve to illustrate the method of my invention by views taken at the point where the bulk is transferred to a vehicle of my invention and at a point where it is delivered therefrom, respectively.

Fig. 8 shows a sectional view of the container of Fig. 1, illustrating in particular the electric arrangements and the operation of the sliding false bottom. In connection therewith the said figure shows an exemplary wiring diagram.

Fig. 9 is a sectional bottom view of a modified bottom slide of my invention.

Fig. 10 shows a side view of a container in which the modified slide of Fig. 9 is used; part of the wall of the container and of a trough below is sectioned away.

Similar numerals refer to similar parts throughout the various views.

The front part of the truck 11 of Fig. 1 is not shown. Behind the cab 12 is arranged, side by side, a prime mover 13, a pump 14, and a small electric generator G, the said parts being coupled to each other for simultaneous operation. It is of course understood that the power for propelling the pump and generator may be directly taken from the engine of truck 11, that the current supplied by the generator may be supplied from the electrical plant, say the battery of the truck, and the suction and compression furnished by the pump may also be supplied otherwise, from an independent source, as well known to engineers.

Behind the prime mover the pump and the generator, is arranged upon the truck 11 the closed container 21. At the top in the back of the container 21, a vacuum chamber 22 is built thereinto, said vacuum chamber communicating with valve 18 by means of the conduit 23. The bottom of chamber 22 is provided with a number of holes which are closed by filter bags 24 of the ordinary construction, depending therefrom.

In other words, when the valves 17 and 20 are closed and the valves 18 and 19 are open, and the pump 14 is rotated in such a manner that the air passes therethrough from the top down, suction is applied to the inside of container 21 by way of the chamber 22, the loose bulk contained in the container being prevented from passing into said chamber and therethrough into said pump, by the filter bag 24.

The filter bags 24 are separated from the space centrally below the chamber 22 by means of a pair of partitions 25 depending from said chamber into container 21. Between said partitions, there is an inlet 26 upon the tank which is suitably flanged at its end 27, so that a suction conduit, for instance a hose 28, may be coupled to the said inlet.

When the loose bulk is to be filled into the container 21, say from a freight car 29 (Fig. 6) the free end of the said hose 28,—which may be provided with suitable proportioning means, for instance a suitable feed nozzle,—is immersed through a suitable opening of the freight car 29 into the loose bulk container therein. When suction is now applied to the container 21 in the manner described above, then the loose bulk material in the freight car, into which the free end of hose 28 is immersed, streams through said hose and through inlet 26 into the container 21 and piles up therein from the left to the right.

In order to prevent the loose bulk, which is sucked in through inlet 26, from damaging the walls of the container, by force of its impact, and in order also to distribute the bulk entering upon the container in a preferred way, a baffle 30 is arranged between the partitions 25 in the container, in the path of the loose bulk entering upon the container through the inlet 26.

Underneath the container 21, and comprised therein, extends a trough 31. Into the said trough issues from the left a conduit 32 which leads to the valve 20. At the rear end of the truck, an outlet 33 opens from trough 31. The said outlet is provided with a flange 34 similar to the flange 27 on inlet 26, so that the hose 28 may be connected to the said outlet in the same manner as it is shown in Fig. 1 to be connected to the inlet 26 (see Fig. 7). A cap 44 closes the in- or outlet, when hose 28 is not connected thereto.

Where the trough 31 merges with the sides of the container 21, horizontal sections or flats 35 close the perforations near the edges of a flexible band 36 (a steel plate for instance), which slides thereon as a trap door for the container, and separates the container from the trough, when extended all the way to the left in said container. (Figs. 1 and 8).

In the rear of the container there is a small compartment 37 just above the trough 31. Underneath the bottom of the front wall of compartment 37 the band 36 slidably extends thereinto. There is a reel accommodating band 36; or the walls of the compartment 37 are shaped in such a manner that the band 36 coils up therein upon itself when slid back into the container, or a spiral 38 may be arranged in the said compartment 37 upon which the band 36 slides into a coiled up position in said compartment when it is moved back in the container.

Rods 39 extend in the container above the trough transversely thereto and serve to retain the band 38 in an extended position upon the flats 35 when said band extends as a trap door between the container and the trough 31.

In the compartment 37 pinions 40 engage upon the perforations of the band 36 in rack and pinion fashion. They are mounted upon a shaft 41. That shaft extends through suitably packed openings in the wall of compartment 37 to the outside of the container, where a gear 42 is mounted thereon. A pinion 43 upon the end of motor M engages upon the gear, so that clockwise rotation (Figs. 1 and 8) of the motor slides the band 36 from between the container 21 and the trough 31 into a coiled-up position in the compartment 37, whereas a counter-clockwise rotation of motor M will propel the band 36 from compartment 37 into a position in which it closes the container 21 towards the trough 31.

Upon the band 36 rest the ends of levers 45 and 46, which are fulcrumed upon the container, inside, at the front and in the rear. The said levers carry mercury switches 47 and 48 respectively, which are connected into the circuit of the motor M and serve to open or close the circuit thereof in a manner to be hereinafter more fully described. It may here be stated that the circuit of the motor M is opened when the lever 45 is raised onto the band 36 near the end of the closing movement of said band, from the right to the left so that the counter-clockwise rotation of said motor is stopped when the band fully separates the container 21 from the trough 31.

When the trap door is opened again,—i. e., when band 36 slides to the right,—the lever 45 slides off band 36 into the position in which it is shown in Fig. 8. A suitable extension 49 of said lever comes to rest on a lug 50 provided upon the inside of container 21, so that the counter clockwise movement of lever 45 is checked in a position, from which it is again shifted into a position of opening the mercury switch 47, when later on the trap door is closed again.

The lever 46 operates in a similar manner and is also provided with an extension, which is marked 51, and which engages upon the stationary lug 52 on the wall of compartment 37; that happens when the trap door is opened fully, lever 46 sliding off the end of band 36 and opening the mercury switch 48. The mercury switch 48 opens and closes the part of the circuit of motor M, which controls the opening movement of the trap door.

When the truck 11 is loaded with loose bulk material and has reached the point where said load is to be delivered, valves 17 and 20 are opened and valves 18 and 19 are closed. Cover 44 is placed onto inlet 27, hose 28 is connected to outlet 33 and is extended into a delivery bin (building 53), and pump 14 is started to suck air in through valve 17, said air passing through valve 20, through trough 31 (the trap door being closed) and through hose 28 into the delivery building 53.

The manner in which the unloading of the truck is completely automatically controlled, will be described later. This general explanation of the unloading proceeds on the assumption of any kind of controlled release of the loose bulk material from the container 21, for instance by a manual operation of the plate 36. The latter may be a solid plate which is moved back or forth on the track provided by flats 35. Or a crank mounted upon shaft 41 will control the positioning of the trap door at will.

As the air blast is started by the foregoing steps, the trap door is partly opened so that the pressure of the blast, as set up at the entrance of the trough, is propagated to the whole container 21. As soon as the container is substantially under the same pressure as the trough, the loose bulk material will begin to flow by gravity out of the container 21 through the partly opened trap door into the trough and will be carried by the air blast into the delivery bin 53.

Should too large a quantity of the loose bulk material drop into the trough, the trap door may be closed to such an extent as to limit the flow of the loose bulk material into the trough. When the flow of the loose bulk material is too slow, the trap door may be opened more, and thus eventually the whole contents of the container 21 are conveyed from the truck into the bin 53, the transfer from the freight car 29 to an ultimate storage bin thus being completed.

An alternative means for controlling the delivery of materials from the container into the delivery building is illustrated by Figs. 4 and 5. This arrangement comprises, in addition to the pump and suction arrangement of the truck heretofore described,—which are not shown,—and the container 54 and trough 55,—which correspond to the container 21 and trough 31 of the prior description,—a screw conveyor 56, extending through the length of the trough and provided with a drive, a motor or crank for instance which are not shown, and a conduit 57 underneath the trough and communicating therewith by way of an opening 58 at the rear. To the end of the conduit 57 the hose 28 may be connected in the manner described above and the pump discharges the air into the conduit 57.

By rotation of the screw conveyor 56 in a clockwise direction (Fig. 5) fixed quantities of the bulk material are delivered to the opening 58 and they are discharged through said opening into the air blast, and thus conveyed into a storage bin in a manner similar to that exhibited in Fig. 7.

The speed at which the screw conveyor 56 is rotated controls the discharge of the material into the air blast, and proper procedure of such discharge may be checked by observing the pressure of the air. preferably at the very entrance of the conduit 57.

The manner in which the air pressure may be observed and may serve to control the delivery of the material from the truck will now be described; aside from gages 59 and 60, which serve to check the rarefaction and the compression of the intake and outlet of the pump, I may provide a suitable gage at the point of entrance of the compressed air into the trough, such a gage being exemplarily indicated by a mercury gage 61 in the drawings. The gage 61 of Fig. 8 connects to conduit 32 at the one end where arrow 62 suggests the entrance of compressed air into said gage. Making use of a mercury column in a crude mercury pressure gage, may not be the means which is practical in all instances for the pressure control of the unloading as it will be hereinafter described, but it will suffice for the purpose of explaining in detail one example of the pressure control of my invention. Many other types of pressure controlled circuit breakers are known, and,—particularly when working between fixed pressure limits,—may here be substituted.

Generally speaking the said pressure control acts as follows:—

The trap door is normally closed when the pump is not driving an air blast through the trough 31, underneath container 21. The trap door remains therefore closed as long as the mercury gage 61 registers substantially atmospheric pressure or less. When pressure is registered, the trap door is to be opened slowly, and this slow opening may proceed continuously until the whole retainer has been emptied.

But it may well happen that, in one or the other instance, while the trap door is being gradually and continuously opened, too much of the loose bulk material slides into the trough and that not all of it may be removed instantly by the blast in the trough, as it is desirable for a smooth function of the device, so that the air cannot freely pass through and carry the loose material out of the trough into the storage bin. Under those circumstances,—if the gradual, continuous opening of the trap door continues,—conditions become worse, until finally the air is not able to work its way through to the outlet 33 at all. Therefore, instead of continuing to open, the trap door stops in its opening movement, or it might even be desirable to close it, partly or wholly, so that the air blast is capable of clearing the trough before additional bulk material is released thereinto.

Making use of the pressure gage 61 for that purpose, it will be understood that it registers a very high or highest pressure when the trough is blocked so that the air blast cannot freely pass therethrough. When the pressure gage registers such a high pressure, it will therefore be an indication for the operator to stop opening the trap door and possibly even to close it partways until the congestion of the trough has been overcome. The fact that the congestion has been overcome will be indicated by a drop of the pressure, whereupon the operator may resume the opening of the trap door in order to release further material into the trough, which then is orderly conveyed into the storage bin.

The means I use and the manner in which I proceed for automatically operating the trap door or a means equivalently releasing loose bulk material,—so that the release of the material into a conveying air blast is controlled by the pressure of said blast,—will be exemplarily described in the following in connection with Fig. 8.

For purposes of clarity in this description, the generator G is presumed to deliver a direct current issuing from the positive terminal (+) thereof. One branch of the current of said generator comprises the electo-magnet 63, which serves to actuate an armature lever 64. The said armature lever is mounted upon the fulcrum shaft 65 of a 5-pole double throw switch 68, the knives of said switch contacting with lugs $a$, $b$, $c$, $d$, $e$, when in the normal position of rest of Fig. 8, whereas they contact with lugs A, B, C, D, E, when the electro-magnet or relay 63 is excited and attracts the armature lever 64. Excitation of the electro-magnet is controlled by the mercury pressure gage 61. The mercury column of said gage closes the circuit of electromagnet, when it is predeterminedly actuated by the pressure of air entering in the direction of arrow 62. For that purpose two terminals of the circuit of electro-magnet 63 enter upon the two legs of the mercury pressure gage at different levels 66 and 67. The level of the mercury when at rest is to a certain distance above the center between the levels 66 and 67, the amount of mercury in said legs and the distance to which its average level is above the said center determining the pressure range at which control of relay 63 takes place, as will readily be understood with those acquainted with this art after a perusal of this exemplary showing. It is sufficient to state here that with the arrangement shown the circuit of the electro-magnet 63 is open when the gage registers substantially atmospheric pressure or less or when there is a high pressure, at which the air drives the mercury column in the right leg of the gage to a point below the level 66. The mercury column closes the circuit of electro-magnet 63 at intermediate pressures which cover the pressure range at which the air blast functions properly.

When the mercury column registers substantially atmospheric pressure or less or an unduly high pressure, the switch 68 is in the position shown in Fig. 8 and the generator current passes through mercury switch 47 to lug c of the switch, and through the switch by way of lug d to the armature of motor M and then back to the generator, and also through the switch by way of lug b to the field F of the motor, back through the switch by way of lugs a and e, and then to the generator. In this instance the motor is presumed to rotate in a counter-clockwise direction, so that the band 36 moves from the right to the left, the trap door being closed. When the end of the trap door engages upon lever 45, as it becomes closed, it breaks the current at the mercury switch 47, so that the supply of current to lug c, which feeds both armature and field of the motor, is interrupted, the motor stops and the whole system is at rest.

The transmission between the motor and the sliding trap door is geared to a low speed of movement of the trap door, so that the trap door opens at the proper speed in order to release the loose bulk material into the air blast at an average speed suitable for discharge into the delivery building 53.

When the air blast is started, the electric system is substantially in the position subscribed just before, the switch 68 being in the position shown in Fig. 8, but the circuit being open at the mercury switch 47, because the trap door is closed. The air blast drives the mercury in gage 61 out of equilibrium, into a position where terminals 66 and 67 are connected, so that now the switch 68 is thrown into contact with lugs A, B, C, D, and E. Mercury switch 48 being closed, the current passes from the generator through said switch to the lug C, into the switch and from there on one side by way of lug D to the armature of motor M and back to the generator, proceeding substantially symmetrically to the way described in connection with the position of rest of the switch; on the other hand it passes from lug B through the field F of the motor in a direction opposite to that in which it passed therethrough before and then back through lugs A and E of the switch 68 to the generator. The field of the motor now being reversed, the band 64 will travel to the right, and the trap door is being opened. The loose bulk material will be slowly released into the trough, the air blast blows out of the trough the quantities of material thus released, and eventually, when fully opened, the trap door will release levers 46, so that the part of the circuit of the motor, which serves to actuate the motor in a clockwise direction is interrupted; thus the motor comes to a stop when the trap door is open. This state will be preserved until the pump is stopped so that the mercury column returns to its position of equilibrium, whereupon the electro-magnet 63 releases the switch 68. The switch 68 drops into the position of Fig. 8, and the trap is closed in the manner described before.

If the opening trap door releases too much bulk material so that the trough becomes congested, the air pressure drives the mercury column in gage 61 so high that the circuit of the electro-magnet is interrupted at 66; thereupon the switch drops into the position of rest shown in Fig. 8, and the direction of rotation of the motor is reversed so that the trap door is being closed. This proceeds until the air blast has removed the excess loose bulk material in the trough, whereupon contact at 66 is restored in the mercury gage 61, because the air pressure has dropped. Thus the direction of rotation of motor M is reversed again, the trap door resumes its opening movement until finally all of the loose bulk material has been discharged from container 21 and carried by the air blast into the storage bin.

A simple completely manual control means for the regulated discharge of the loose bulk material from the container is illustrated in Figs. 9 and 10. Only the lower part of the container is shown and it is arranged symmetrically. Again the container 71 merges at the bottom with a trough 72, and at both ends of the trough I provide flange connections 73 and 74, one being connected to the air blast delivered from a pump or compressor, the other one to the delivery conduit leading to a storage bin. On both ends of the container 71 are arranged above the trough similar compartments 75 and 76. In these compartments are coiled up the ends of a flexible plate 77 upon shafts, which may be rotated by the crank handles 78, arranged upon the outside of said compartments. The flexible band 77 again slides upon suitable means on both sides of the conveyor 72, so that it closes the container 71 towards the trough 72; but the band is provided with a transverse slot 79, upon which is superimposed, upon the bottom side of band 72, a plate 80. By means of slots 81 and wing nuts 82, the plate 80 may be adjusted lengthwise at will upon the band 72, that the free aperture of slot 79 may be adjusted to any desired width. By manipulating one or the other handle 78, the slot 79 may be positioned at any point near the bottom of the container, or may be moved from the container into one or the other of compartments 75 or 76. In this manner the point at which the loose bulk material contained in the container is released therefrom may be shifted along substantially the whole length of said container.

That shifting may be of particular use when the material is graded, or assorted in the container. A grading of the material, as it is introduced into the container, is brought about by providing therein one or more transverse partitions like 91 and 92, extending from one side of the container to the other, but extending only partways up therein, thus forming bins which clear the blast conveying the loose bulk material, which enters through the inlet 26.

To those acquainted with the conveying of loose bulk material in the blast of a gas, air for instance, it is known that, as the speed of said blast decreases, the heavier grain material drop first, the lighter grain material later, and the finest dust is precipitated last, if at all.

In the container of my invention the air blast travels substantially through the whole length thereof, and then the air is circulated to the rear of the container where it leaves through the vacuum chamber 22. Thus I might arrange that the heaviest material carried by the air drops to the left of the partition 92 (Fig. 1), light material drops between the partitions 92, 91, and the dust drops into the bin in the back of the container, behind partition 91. Into the last mentioned bin will also drop the dust which clings to the filters 24, when those filters are shaken.

As the band 36 is withdrawn from between the container 21 and the trough 31, the heavy loose bulk material to the left of partition 92 drops first into the trough 31. When the end of the band comes into alignment with the bottom of partition 92, the compressor pump 14 may be stopped and the outlet 33 may be connected to another receiving or storage receiver which is reserved for the finer grain material which drops out of the bin confronted by partitions 92 and 91 as the band 36 is further withdrawn, after the pump has been started again. In like manner the finest grain material or dust in the bin to the right of partition 91 may be withdrawn separately and may be discarded if it is undesirable.

The number of partitions and the spacing of said partitions from each other are factors controlling the degree of assorting or grading brought about and may be greatly varied according to the material handled and the use to which the said material is ultimately converted.

A crank handle like 78 may of course also be attached either to the end of shaft 41 or to the shaft of motor M (Figs. 1 and 8). In that case the whole reversing circuit of the motor may be omitted, because the reversing may be done by the crank, and when too much of the loose bulk material flows out of the container into the trough, the movement of the trap doors 36 is temporarily stopped instead of being reversed. In that instance the electric circuit is considerably simplified, as well understood by those acquainted with this art. It may then be reduced to an arrangement of the generator, motor, the pressure controlled switch 61, and mercury switch 48 in series.

However, it will readily be understood by those acquainted with this art that the control of the trap door may be brought about in a finer degree of adjustment by the use of more complicated control circuits. I therefore do not want to limit the protection granted to me by this patent to the very control of the release of the loose bulk material shown, nor to the method and means described in the specification and shown in the drawings, but reserve the right to make changes and alterations in the form of embodiment of my inventions, which do not depart from the spirit and scope thereof.

What I claim is:

1. The method of delivering loose bulk material from one container into a second container, comprising directing a current of air past the first container into the second container, releasing said material from said first container into said current of air, said released material being conveyed by said current into the second container, and controlling said release in accordance with the fluctuations of pressure set up in said current by the material released thereinto.

2. Means for transferring loose bulk material, comprising a vehicle, a container on said vehicle storing said material for transportation by said vehicle, means sucking said material into said container, a valve for shutting off said sucking means relatively to said container, a delivery conduit underneath said container, means driving air through said conduit, and means controlledly releasing said material from progressive points of said container into said conduit.

3. Means for transferring loose bulk material, comprising a vehicle, a pump, a container on said vehicle, means connecting the intake of said pump to said container, so that said material may be sucked into said container, a delivery conduit connecting with various points of said container, means for successively releasing material from said points of said container into said conduit, and means connecting the outlet of said pump to said conduit, so that a current of air may be blown through said conduit and said released material may be conveyed away thereby.

4. Means transferring loose bulk material comprising a vehicle, a pump, a container on said vehicle, means connecting the intake of said pump to said container, so that said material may be sucked into said container, a delivery conduit operatively connected with the outlet of said pump, a device actuated by the pressure of the air passing from said pump into said conduit, and means operatively connected with said device and releasing material from said container into said conduit.

5. Means for transferring loose bulk material comprising a vehicle, a pump and a container on said vehicle, means connecting the intake of said pump to said container, so that said material may be sucked into said container, a trough communicating with said container along the bottom thereof and communicating with the outlet of the pump at one end and outwardly opening at the other end, a trap door extending longitudinally of said container and said trough, and a mechanism for gradually and continuously opening said trap door from one end of said container to the other.

6. Means for transferring loose bulk material comprising a vehicle, a pump and a container on said vehicle, means connecting the intake of said pump to said container, so that said material may be sucked into said container, a trough communicating with said container along the bottom thereof and communicating with the outlet of the pump at one end and outwardly opening at the other end, a trap door adjustably interposed between said container and said trough, a mechanism opening said trap door and releasing said material from said container into said trough, said material being conveyed out of said trough by the air circulated therethrough, and means reacting upon said circulated air as obstructed by material released into said trough and collecting therein at one time, said means controlling said mechanism.

7. Means transferring loose bulk material comprising a vehicle, a pump, a container on said vehicle, means connecting the intake of said pump to said container, so that said material may be sucked into said container, a trough communicating with said container along the bottom thereof and communicating with the outlet of the pump at one end and outwardly opening at the other end, a trap door adjustably interposed between said container and said trough, a mechanism opening said trap door and releasing said material from said container into said trough, said material being conveyed out of said trough by the air circulated therethrough, and a pressure gage reacting upon the flow of air conveyed by said pump through said trough and operatively connected with and controlling said mechanism.

8. Means transferring loose bulk material comprising a vehicle, a pump, a container on said vehicle, means connecting the intake of said pump to said container, so that the said material may be sucked into said container, a trough communicating with said container along the bottom thereof and communicating with the outlet of the pump at one end and outwardly opening at the other end, a trap door adjustably interposed between said container and said trough, a motor opening said trap door and releasing said material from said container into said trough, said material being conveyed out of said trough by the air circulated therethrough, and a pressure gage reacting upon the flow of air conveyed by said pump through said trough and operatively connected with and controlling said motor.

9. In a means transferring loose bulk material, a container, a trough communicating with said container, a flexible trap door slidably interposed between said container and said trough, a compartment into which said door extends, and means in said compartment coiling up said door when slid thereinto.

10. In a means transferring loose bulk material, a container, a trough communicating with said container, a flexible trap door slidably interposed between said container and said trough, a compartment into which said door extends, means in said compartment coiling up said door when slid thereinto, and a mechanism predeterminedly propelling said door between a position in which it closes said container towards said trough and a coiled up position in said compartment.

11. In a means transferring loose bulk material, a container, a trough communicating with said container, a door interposed between said container and said trough and controlling the release of said material from the former into the latter, a mechanism operating said door, a pump propelling air through said trough and conveying said material therefrom, a gage measuring the pressure of said propelled air, and means controlled by said gage and opening and closing said door.

12. In a means transferring loose bulk material, a container, a trough communicating with said container, a door interposed between said container and said trough and controlling the release of said material from the former into the latter, a mechanism operating said door, a pump propelling air through said trough and conveying said material therefrom, a gage measuring the pressure of said propelled air, and means controlled by said gage and opening said door at a predetermined pressure of air and closing said door at pressures above and below said predetermined pressures.

13. In a means transferring loose bulk material, a container, a partition dividing said container into bins for different grades of said material, a trough communicating with said bins, and a door interposed between said container and said trough and successively opening said bins towards said trough when operated.

14. The method of pneumatically discharging the contents of loose bulk material from a container on a vehicle, comprising conducting a current of air past a low part of said container, and successively opening said container at various points onto said current, so that continuously additional material is released from additional parts of said container.

15. The method of pneumatically discharging loose bulk material from a closed container on a vehicle, comprising conducting a current of air past a low part of said container, and progressively opening said part of the container along a straight horizontal path, so that additional material continuously drops into said current and is transmitted thereby.

16. The method of pneumatically discharging a container on a car, comprising conducting a current of air past the bottom of said container, and in chronological progression sectionally opening said bottom, so that material from different sections continuously drops into said current and is transmitted thereby.

LUDWIG F. HOLLY.